(No Model.)

T. C. ELLIOTT.
Corn Husking Roller.

No. 234,120. Patented Nov. 9, 1880.

Witnesses
Chas H Smith
Geo. T. Pinckney

Inventor
Theodore C. Elliott
per Lemuel W. Serrell
atty.

UNITED STATES PATENT OFFICE.

THEODORE C. ELLIOTT, OF EAST ORANGE, NEW JERSEY.

CORN-HUSKING ROLLER.

SPECIFICATION forming part of Letters Patent No. 234,120, dated November 9, 1880.

Application filed March 4, 1880. (No model.)

*To all whom it may concern:*

Be it known that I, THEODORE C. ELLIOTT, of East Orange, in the county of Essex and State of New Jersey, have invented an Improvement in Corn-Husking Rollers, of which the following is a specification.

In corn-husking machines the rollers have been provided with round india-rubber plugs, the ends of which project beyond the surface of the metal, so as to act upon the husk and loosen the same to give the rollers an opportunity to grasp the husk and pull it off. In these rollers the round edge of the rubber becomes worn rapidly, because there is but a small extent of wearing-surface. I make use of blocks in the form of truncated pyramids introduced into shells that are fastened around a square or prismatic shaft. The base of the pyramid rests upon the shaft. The shell retains the same in place. Two edges of the projecting rubber are in line with the axis of the roller, and hence present considerable length of wearing-edges, and therefore the blocks are more durable, and they can be turned around if desired, and when worn the blocks can be taken out and others substituted. The shells are secured to the shaft by screw-rings at the ends.

Figure 1:
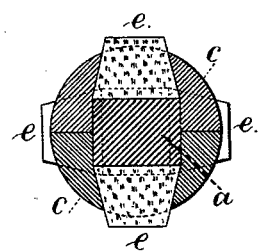
Figure 2:
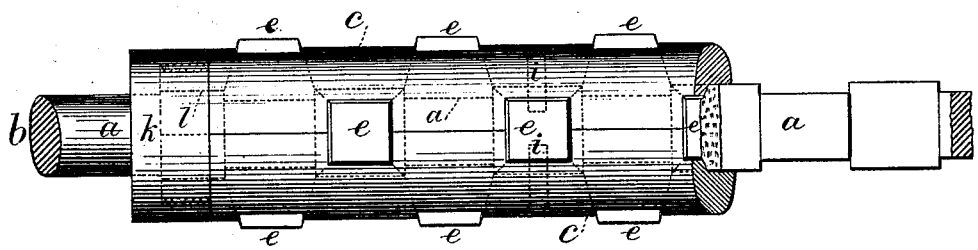
Figure 3:
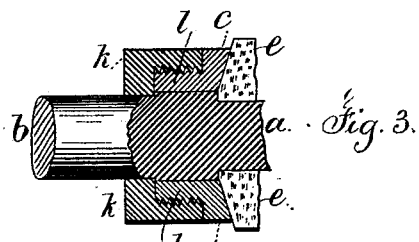

In the drawings, Figure 1 is a cross-section of the roller complete, and Fig. 2 shows one end of the roller with the shells partially in section. Fig. 3 is a section of one end of the roller.

The shaft *a* is of suitable size and length, and the ends *b* are cylindrical to form journals, and the body of the shaft is square or prismatic. The shells *c c* fit upon the prismatic portion of the shaft and are cylindrical upon their surfaces. In these shells there are mortises that are largest at the inner end, so as to be adapted to receive the pyramidal rubbers *e e*. The bases of these rubbers rest upon the prismatic shaft, and the upper surfaces of the truncated pyramids rise above the surfaces of the roller to catch the corn-husks, loosen them, and allow the pair of rollers to pull such husks off the ear. Two sides of the pyramidal blocks are in planes parallel with the axis of the rollers, and hence the upper edges, between which and the adjacent roller the husk is nipped and loosened, form extended angles that do not wear as rapidly as the angles of the round plugs before used.

With two shells it is preferable to use four rows of rubbers, two of the rows being in the middle of the shells, and the other two rows of rubbers occupying mortises formed half in each shell. The shells are attached to the shaft, preferably, by screws *i i*, and at the ends there are rings *k*, that slip over the tongues *l* at the end of each shell.

It will generally be best to form screw-threads on the surfaces of the tongues and screw the rings *k* upon the same.

I claim as my invention—

1. In a corn-husking roller, the combination of a removable shell having openings or mortises that are largest at their inner ends with pyramidal blocks of india-rubber, substantially as set forth.

2. The prismatic shaft, in combination with the removable shells, the pyramidal blocks of rubber, and the clamping-rings, substantially as set forth.

Signed by me this 2d day of March, A. D. 1880.

THEODORE C. ELLIOTT.

Witnesses:
 GEO. T. PINCKNEY,
 WILLIAM G. MOTT.